Patented Nov. 24, 1931

1,833,125

UNITED STATES PATENT OFFICE

WILLIAM C. READ, OF SCARSDALE, NEW YORK, ASSIGNOR TO ELECTRO METALLURGICAL COMPANY, A CORPORATION OF WEST VIRGINIA

SMELTING PROCESS FOR ELIMINATING PHOSPHORUS

No Drawing.   Application filed April 3, 1930.   Serial No. 441,426.

Many ores of tungsten, molybdenum and vanadium contain so much phosphorus that they are unsuitable for the production of ferroalloys. The usual concentrating processes do not remove the phosphorus sufficiently, if at all; and special treatment for phosphorus elimination is likely to be prohibitively expensive.

The present invention is a process for smelting high-phosphorus ores and concentrates of the metals under discussion. By the use of the invention it is possible economically to recover the metal values as an alloy in which the ratio of percentage of valuable metal to percentage of phosphorus is much higher than in the material smelted. It will of course be understood that in some of the processes used in concentrating these ores the chemical composition of the ore is changed, as where sodium vanadate is formed from vanadium ores. The invention is applicable to such chemical concentrates as well as to other types of concentrates, and to unconcentrated ores having a sufficiently high metal content.

The process is carried out by smelting the ore or concentrate with an excess of silicon in the presence of a basic slag. The silicon used in the reduction may be in the commercially pure form (so-called silicon metal), or in the form of commercial ferrosilicon. If the reducing agent and the ore do not together contain as much as is to be present in the reduced metal, more iron can of course be added to the charge. The excess of reducing agent should be such that the alloy produced will contain at least about 10% of Si, and percentages up to 30% and even higher give good results. The ore and the silicon-containing metal are preferably ground or crushed, and mixed together and with the basic flux, the mixture being charged into a suitable electric furnace for smelting.

Lime is the preferred base. Excellent phosphorus elimination has been obtained when the base-to-acid ratio in the slag was approximately 2. A typical slag had the following analysis:

|  | Per cent |
| --- | --- |
| CaO | 60.28 |
| MgO | 4.80 |
| SiO$_2$ | 33.34 |

The base-to-acid ratio of this slag, calculated in the usual way, is 1.95. Slags with ratios of 3 or more have also been used successfully. Such slags as those which have been mentioned have no objectionable features, and since they are very effective the lowest basicities which can be used have not been investigated. However, my experience with the process leads me to believe that slags having a ratio of less than unity will not give acceptable results in most cases, and I do not recommend them.

The invention may be applied to any of the tungsten ores or concentrates, and is especially valuable for the working of ores of the iron-tungsten class, such as ferberite ores, and to the calcium-tungstate ores such as the scheelites, since these ores, and particularly the former class, often carry much phosphorus.

In a particular run the charge was made up as follows:

|  | Parts |
| --- | --- |
| Ferberite ore | 200 |
| Silicon metal | 116 |
| Lime | 270 |

The ore contained 26.34% W and 0.264% P, the ratio $$\frac{W}{P}$$

being 100. The alloy produced analyzed:

|  | Per cent |
| --- | --- |
| W | 30.38 |
| Si | 29.35 |
| P | 0.013 | with the balance mostly iron. In the alloy, the ratio $$\frac{W}{P}$$

exceeded 2300.

In another run the charge was as follows:

| | Parts |
|---|---|
| Scheelite ore | 196 |
| Silicon metal | 88 |
| Steel scrap | 15 |
| Lime | 200 |

The ore contained 52.94% W and 0.085% P. The alloy produced analyzed:

| | Per cent |
|---|---|
| W | 55.79 |
| Si | 26.55 |
| P | 0.010 |

The elimination of 90–95% of the phosphorus contained in the ore is usual.

The following example illustrates the invention as applied to a high-phosphorus sodium molybdate. The charge consisted of

| | Parts |
|---|---|
| Sodium molybdate | 3000 |
| Ferrosilicon (50% Si) | 780 |
| Silicon metal | 840 |
| Lime | 4710 |
| Total | 9330 |

The sodium molybdate analyzed:

| | Per cent |
|---|---|
| Mo | 13.55 |
| Fe | 11.64 |
| P | 0.185 |
| $SiO_2$ | 14.00 |
| Moisture | 5.30 |

$$\text{Ratio } \frac{Mo}{P} = 73$$

The charge was divided into three batches and smelted in an electric furnace lined with magnesia materials. The slag was tapped off after each batch of mixture had been furnaced, and the alloy was allowed to solidify on the hearth. When cool the alloy was removed, cleaned and crushed. Its analysis was as follows:

| | |
|---|---|
| Mo | 18.50 per cent |
| Si | 29.41 per cent |
| P | Trace |
| Balance | Largely iron |

$$\text{Ratio } \frac{Mo}{P}, \text{ over 2000}$$

The slag contained:

| | Per cent |
|---|---|
| CaO | 60.65 |
| $SiO_2$ | 29.50 |

The elimination of phosphorus was substantially complete. It will be noted that the base-to-acid ratio in the slag was higher than 2.

The following example illustrates the invention as applied to a high-phosphorus sodium vanadate. The charge consisted of:

| | Parts |
|---|---|
| Sodium vanadate | 200 |
| Silicon metal | 120 |
| Ferrosilicon (59% Si) | 30 |
| Lime | 550 |
| Fluorspar | 35 |

The sodium vanadate analyzed:

| | Per cent |
|---|---|
| V | 9.74 |
| P | 0.24 |

$$\text{Ratio } \frac{V}{P} = 40$$

The charge was smelted in a magnesia-lined electric furnace and yielded products of the following composition:

*Alloy*

| | Per cent |
|---|---|
| V | 23.20 |
| Si | 33.08 |
| Fe | 37.75 |
| P | 0.058 |

*Slag*

| | Per cent |
|---|---|
| CaO | 52.28 |
| SiO | 28.94 |

$$\text{Ratio } \frac{V}{P} = 400$$

Less than 9% of the phosphorus present in the sodium vanadate entered the ferrovanadium. The ratio of base to acid in the slag is higher than 2 when the soda from the sodium vanadate and the magnesia dissolved from the furnace lining are taken into account.

The alloy produced in any of the foregoing examples may be used without further treatment or it may be furnaced with a low phosphorus ore containing one or more of the metals present in the alloy, or with mill scale or other oxidizing agent in accordance with methods well known in the art to remove silicon and produce a commercial ferroalloy low in silicon and phosphorus.

This application contains matter disclosed in my pending application Serial No. 264,959, filed March 26, 1928.

I claim:—

1. Process of recovering a metal of the group consisting of tungsten, molybdenum and vanadium by smelting a high phosphorus ore or concentrate of such metal which comprises mixing the ore or concentrate with a metal rich in silicon and heating the mixture to a smelting temperature in the presence of a lime slag having a base-to-acid ratio at least about 2, the proportion of silicon used being sufficient to reduce the ore or concentrate and give a reduction product containing at least 10% Si.

2. Process of smelting phosphorus-contaminated tungsten ores or concentrates which comprises mixing the ore or concentrate with a metal rich in silicon and heating the mixture to a smelting temperature in the presence of a lime slag having a base-to-acid ratio at least about 2, the proportion of silicon used being sufficient to reduce the ore or concentrate and give a reduction product containing at least 10% Si.

In testimony whereof, I affix my signature.
WILLIAM C. READ.